(12) United States Patent
Vipond

(10) Patent No.: US 7,117,954 B2
(45) Date of Patent: Oct. 10, 2006

(54) WEED PULLER

(76) Inventor: Bryan Vipond, 282 Yosemite Way, San Jacinto, CA (US) 92581

( * ) Notice: Subject to any disclaimer, the term of this patent is extended or adjusted under 35 U.S.C. 154(b) by 0 days.

(21) Appl. No.: 10/872,631

(22) Filed: Jun. 21, 2004

(65) Prior Publication Data

US 2005/0279516 A1    Dec. 22, 2005

(51) Int. Cl.
*A01B 1/16*    (2006.01)

(52) U.S. Cl. .................. 172/378; 111/101; 111/106

(58) Field of Classification Search ........... 172/21, 172/22, 371, 378–380; 111/101, 106; 294/49, 294/50.6, 50.7; 175/20; 47/1.01 R, 1.01 D
See application file for complete search history.

(56) References Cited

U.S. PATENT DOCUMENTS

| | | | |
|---|---|---|---|
| 263,038 A | 8/1882 | Fleming | |
| 530,866 A | 12/1894 | Vanhouten | |
| 776,191 A | 11/1904 | Lynch | |
| 946,470 A | 2/1910 | Geissenhainer et al. | |
| 949,796 A | 2/1910 | Howard | |
| 1,092,818 A * | 4/1914 | Bittner, Jr. | 294/50.5 |
| 1,229,732 A | 6/1917 | Erickson | |
| 1,665,109 A * | 4/1928 | Nelson | 30/277 |
| 2,485,877 A | 10/1949 | Hamilton, Jr. | |
| 2,593,283 A * | 4/1952 | Erlebach, Sr. | 294/50 |
| 2,606,055 A * | 8/1952 | Johnson | 294/50.6 |
| 2,754,585 A | 7/1956 | Green | |
| 3,036,482 A | 5/1962 | Kenworthy et al. | |
| 3,273,930 A * | 9/1966 | Gottfried | 111/101 |
| 3,444,938 A * | 5/1969 | Ballmann | 111/101 |
| 3,506,296 A * | 4/1970 | Nelson | 111/101 |
| 3,568,657 A | 3/1971 | Gue | |
| 3,596,966 A * | 8/1971 | Shredl | 294/61 |
| 3,696,873 A | 10/1972 | Anderson | |
| 3,712,389 A | 1/1973 | Smoak | |
| 4,101,088 A | 7/1978 | Stauth | |
| 4,241,795 A | 12/1980 | Landry, Jr. | |
| 4,290,374 A * | 9/1981 | Maples | 111/92 |
| 4,458,415 A | 7/1984 | Maher et al. | |
| 4,466,188 A | 8/1984 | Svendsgaard | |
| 4,585,072 A * | 4/1986 | Martinez | 172/22 |
| 4,974,682 A * | 12/1990 | Hoffman | 172/22 |
| D318,993 S * | 8/1991 | Brady | D8/13 |
| 5,040,614 A | 8/1991 | Nash | |
| 5,193,871 A * | 3/1993 | Williams | 294/61 |
| 5,234,241 A * | 8/1993 | Ikerd | 294/50.8 |
| 5,261,496 A * | 11/1993 | Smotherman | 172/25 |
| 5,330,010 A * | 7/1994 | Smotherman | 172/25 |
| 5,338,078 A * | 8/1994 | Basek | 294/50.5 |
| 5,370,192 A | 12/1994 | Evinger | |
| 5,469,923 A * | 11/1995 | Visser | 172/22 |
| 5,662,179 A * | 9/1997 | Falk | 175/20 |
| 5,706,900 A * | 1/1998 | Liao | 172/378 |
| 5,768,785 A | 6/1998 | Pessin | |

(Continued)

*Primary Examiner*—Thomas B. Will
*Assistant Examiner*—Alexandra Pechhold

(57) ABSTRACT

A weed puller that comprises a plurality of prongs positioned about an axis, an anvil plate, and a moveable mass adapted to be driven into the anvil plate so as to transmit a force through the anvil plate to the prongs where the force has a substantial component in line with the axis about which the plurality of prongs are positioned. In a preferred embodiment, the weed puller comprises a body having a cavity that terminates at the anvil plate with the moveable mass slideably positioned within the cavity and the moveable mass being coupled to a rod that extends out of the cavity from an end opposite the anvil plate.

18 Claims, 3 Drawing Sheets

U.S. PATENT DOCUMENTS 5,865,490 A    2/1999   Vowell
5,887,920 A    3/1999   Perciful
6,123,374 A *  9/2000   Elder .......................... 294/50
6,374,758 B1 * 4/2002   Mickle et al. ............... 111/106
6,386,294 B1 * 5/2002   Best ............................ 172/22
6,662,879 B1 * 12/2003  Costa .......................... 172/22

* cited by examiner

WEED PULLER

FIELD OF THE INVENTION

The present invention relates generally to manual weed pullers.

BACKGROUND OF THE INVENTION

Tools useful in pulling weeds from soil (i.e. weed pullers) are well known. However, many prior art devices are not suitable for use by people who with relatively little strength and/or flexibility. Moreover, a number of people with relatively little strength and/or flexibility have minimal or no income, but have a need to remove weeds. As such, there is a need for weed pullers that are simple to use, can be used by those having relatively little strength and/or flexibility, and which can be manufactured cheaply enough to be affordable by those with minimal or no income.

SUMMARY OF THE INVENTION

The present invention is directed to a weed puller that comprises a plurality of prongs positioned about an axis, an anvil plate, and a moveable mass adapted to be driven into the anvil plate so as to transmit a force through the anvil plate to the prongs where the force has a substantial component in line with the axis about which the plurality of prongs are positioned. In a preferred embodiment, the weed puller comprises a body having a cavity that terminates at the anvil plate with the moveable mass slideably positioned within the cavity and the moveable mass being coupled to a rod that extends out of the cavity from an end opposite the anvil plate.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
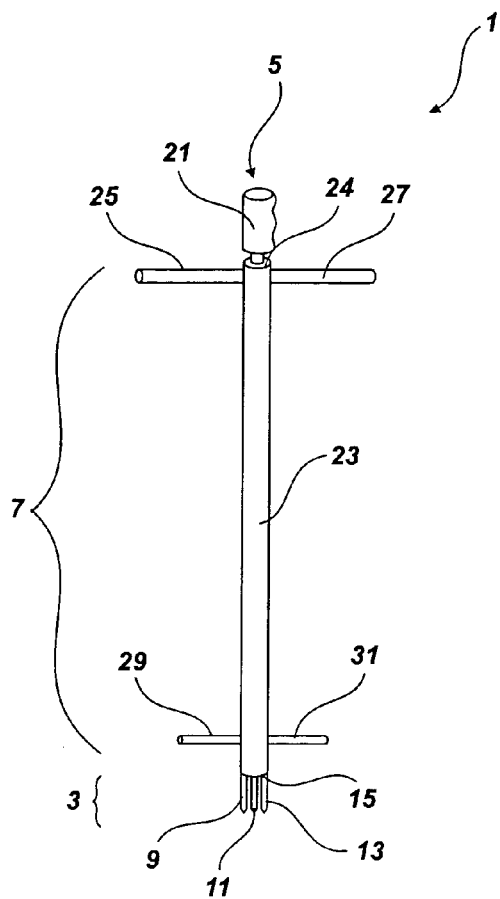
FIG. 1 is a perspective view of a first weed puller according to the present invention.
Figure 2:
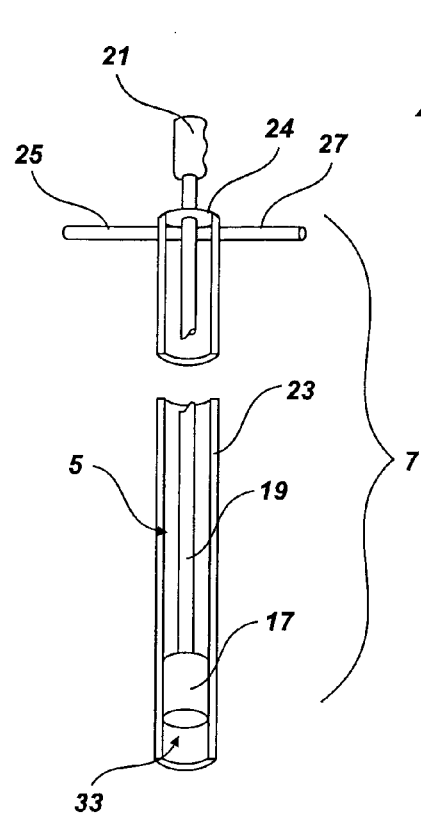
FIG. 2 is a cutaway detailed view of the weed puller of FIG. 1.
Figure 3:
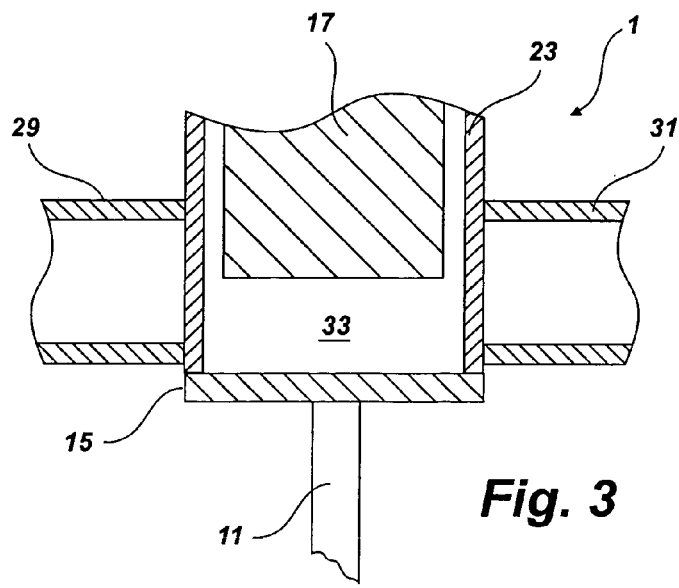
FIG. 3 is a second cutaway detailed view of the weed puller of FIG. 1.
Figure 4:
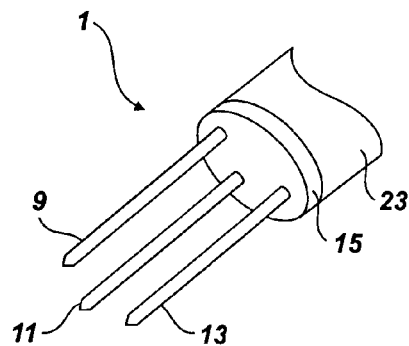
FIG. 4 is a detailed perspective view of the prongs of the weed puller of FIG. 1.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Referring to FIGS. 1–5, a preferred weed puller 1 comprises a prong assembly 3, a driver assembly 5, and a body assembly 7. Prong assembly 3 comprises prongs 9, 11 and 13, and anvil plate 15. Driver assembly 5 comprises a mass 17, a rod 19, and a handle 21 coupled to mass 17 via rod 19. Handle 21 comprise a grip positioned on an end of rod 19. Body assembly 7 comprises body 23, handles 25 and 27, foot bars 29 and 31, and cavity 33.

Weed puller 1 is used to pull a weed by positioning the tips of prongs 9–13 against the ground such that the weed is positioned at a point within the triangle defined by the prongs, using handle 21 to pull mass 17 away from anvil plate 15, and releasing handle 5 to allow gravity to accelerate mass 17 towards plate 15. When mass 17 strikes plate 15, prongs 9–13 are driven into the ground around the weed. Handles 25 and 27 can then be used to extract the prongs from the ground.

Weed puller 1 can be manufactured by welding prongs 9–13 to plate 15, welding plate 15 to the end of a pipe used as body 23, sliding mass 17 coupled to rod 19 into the body, welding a cover plate 24 having rod 19 passing through it onto the end of the pipe body 23 opposite the anvil plate. Handles 25 and 27, and foot rests 29 and 31 may then be coupled to body 23, or may have been coupled to body 23 at some earlier point during assembly. The grip of handle 21 may be placed on rod 19 after cover plate 24 is positioned on rod 19 and either before or after it is welded to body 23.

It is preferred that all the members of weed puller 1 except the grip of handle 21 will be formed from a metal or metal alloy such as steel. However, alternative embodiments may used one or more alternative materials or combinations of materials for any of the elements.

It is contemplated that alternative embodiments may comprise additional numbers of the components described, may utilize fewer numbers of the components described, may comprise subsets of the components described and may comprise elements in addition to those described.

Figure 9:
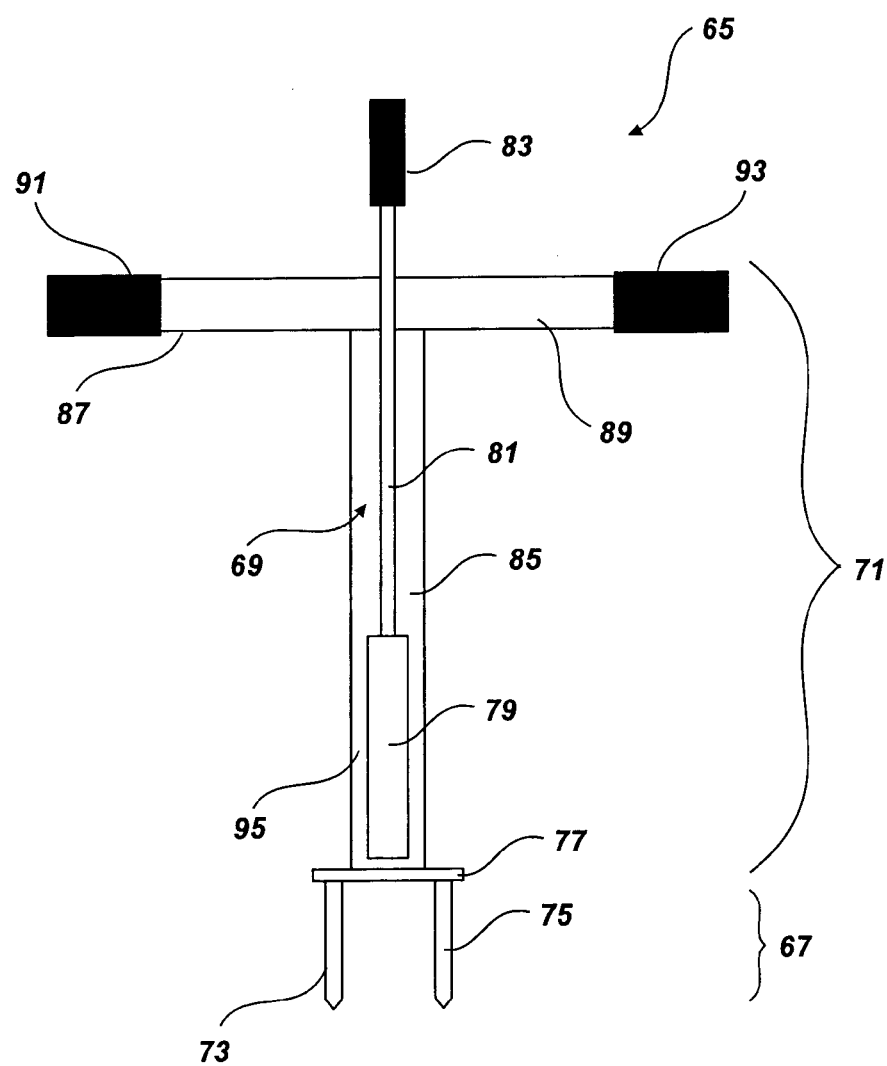
FIG. 9 is a cutaway view of an alternative weed puller.

It is contemplated that the size, shape, positions, and orientations of the various elements may differ between embodiments, and that the methods used to coupled the elements together may also vary. As such, some embodiments may not comprise foot bars 29 or 39 (as shown in the embodiment of FIG. 9). As another example, some embodiments may utilize threads and/or adhesive bonds instead of welds.

Although the actual dimensions may vary between embodiments, the currently preferred form of the weed puller has: a body between 16 and 48 inches long, having walls between $1/64$ and $1/2$ inch thick, an internal diameter of between $1/2$ and 4 inches, and an external diameter between $1/2$ and 5 inches; handles that each project outward from the body by 1 to 18 inches; a driver handle that projects outward from the body by 1 to 12 inches when the mass is adjacent to the anvil plate and includes finger contours; a driver rod having a length of 7 to 48 inches and formed from cylindrical rod having a diameter of 1/16 to 4 inches; a cylindrical mass having an diameter slightly smaller than the internal diameter of the body, a length between 1 and 30 inches, and a weight of 1/4 to 10 pounds; three prongs positioned at the corners of an equilateral triangle having sides between 1/2 and 10 inches long, the prongs having a length between 1/2 and 14 inches, and a diameter between 1/16 and 2 inches; and an anvil plate having a diameter between 1/2 and 12 inches and a thickness between 1/32 and 2 inches.

A more preferred embodiment has: a body between 29 and 31 inches long, having walls between 1/32 and 3/32 of an inch thick, an internal diameter of between 1 and 1 3/8 inches, and an external diameter between 1 1/8 and 1 3/8 inches; handles that each project outward from the body by 6 to 7 inches; a driver handle that projects outward from the body by 7 to 9 inches when the mass is adjacent to the anvil plate and includes finger contours; a driver rod having a length of 28 to 30 inches and formed from cylindrical rod having a diameter of 1/4 to 1/2 of an inch; a cylindrical mass having an diameter sufficiently smaller than the internal diameter of the body to allow it to slide within the body, a length between 6 and 8 inches, and a weight of 3 to 5 pounds; three prongs positioned at the corners of an equilateral triangle having sides between 1 and 3 inches long, the prongs having a length between 4 and 5 inches; and an anvil plate having a diameter between 0 and 3 inches larger than the external diameter of the body.

The currently most preferred embodiment has: a body 30 inches long, having walls 1/16 of an inch thick, an internal diameter of 1 1/8 inches, and an external diameter of 1 1/4 inches; handles that each project outward from the body by 6 1/2 inches; a driver handle that projects outward from the body by 8 inches when the mass is adjacent to the anvil plate and includes finger contours; a driver rod having a length of 39 inches and formed from cylindrical rod having a diameter of 3/8 of an inch; a cylindrical mass having an diameter sufficiently smaller than the internal diameter of the body to allow it to slide within the body, a length of 7 inches, and a weight of 4 pounds; three prongs positioned at the corners of an equilateral triangle having sides that are 2 inches long, the prongs having a length of 4 1/2 inches; and an anvil plate having a diameter between 0 and 3 inches larger than the external diameter of the body.

Figure 6:
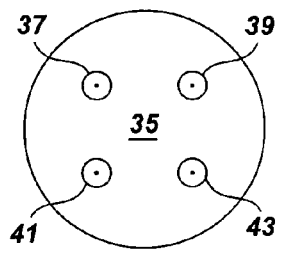
FIG. 6 is a bottom view of an alternative weed puller having four prongs.
Figure 5:
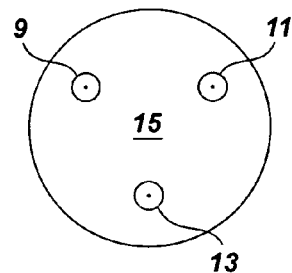
FIG. 5 is a bottom view of the weed puller of FIG. 1.
Figure 7:
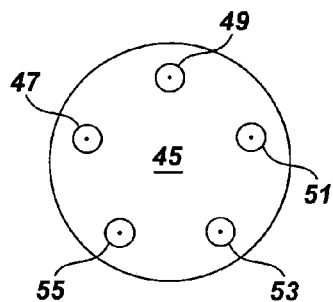
FIG. 7 is a bottom view of an alternative weed puller having five prongs.
Figure 8:
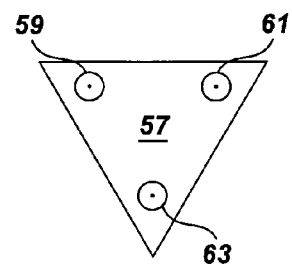
FIG. 8 is a bottom view of an alternative weed puller having three prongs and a triangular anvil plate.

It is preferred that the number, positioning, and orientation of the prongs 9–13 be such that removal of the prongs from the soil does not result in a plug containing the weed to be pulled from the soil, and, if such a plug should be removed, that it can easily be removed from the end of the weed puller. Although an equilateral triangle patters is preferred, alternative patters such as the square pattern of FIG. 6, or the pentagon patter of FIG. 7 are also contemplated as are other regular and irregular patterns. It is also preferred that the center line of body 23 and line of movement of mass 17 pass through a point on plate 15 that is positioned within the shape defined by the prongs 9–13, and preferably through the center of that shape. In FIG. 6, prongs 37, 39, 41, and 43 are coupled to plate 35. In FIG. 7, prongs 47, 49, 51, 53, and 55 are coupled to plate 45. In FIG. 8, prongs 59, 61, and 63 are coupled to plate 57.

The prongs each preferably are elongated, pointed, and comprise a center line parallel to the center line of body 23 such that the driving force imparted by mass 17 striking anvil 15 after sliding along the center line of body 23 in cavity 33 is substantially in the same direction that the prongs point. It is also contemplated that having prongs substantially parallel to each other helps prevent pulling plugs from soil, and removal of any soil that does get removed. However, some embodiments may have prongs that are not parallel with each other or with the center line of body 23 in that their center lines differ by an angle of up to 30 degrees. Due to manufacturing limitations, the term "substantially parallel" should be interpreted as including lines or axis that differ by an angle of up to 15 degrees, although preferred embodiments will differ by an angle of less than 5 degrees, and even more preferred embodiments by less than 2 degrees.

It should be noted that although the number of prongs may be greater than three, the spacing between prongs should never be such that the prongs are equivalent to a solid wall as spacing them that close together will generally result in plugs being pulled from the ground, and difficulty removing such plugs. It is also contemplated that the use of spaced apart prongs rather than closely spaced prongs or a wall may allow the prongs to pierce, but not cut, the leaves and/or body of the weed such that the weed will be pulled from the ground when the prongs are extracted from the ground.

As shown in FIG. 8, anvil plate 15 may comprise a non-circular shape. However, it is contemplated that the use of a circular plate as the anvil plate is particularly advantageous in regard to manufacturing ease and cost, and as will be discussed in regard to the embodiment of FIG. 9, provides a flange circling the body of the weed puller such that foot bars are not needed.

In FIG. 9, weed puller 65 comprises a prong assembly 67, a driver assembly 69, and a body 71. Prong assembly 67 comprises prongs 73 and 75 (and a third prong not shown), and anvil 77. Driver assembly 69 comprises a mass 79, a rod 81, and a handle 83. Body assembly 71 comprises body 85, handles 87 and 89, grips 91 and 93, and cavity 95. The embodiment of FIG. 9 differs from that of FIGS. 1–5 primarily in regard to having a larger diameter anvil plate 77 and not including foot bars. Weed puller 65 also comprises non-metallic grips 91 and 93 that help dampen any vibration that might otherwise be transmitted by handles 87 and 89.

It is contemplated that having anvil plate 77 have a diameter substantially larger than that of body 79 provides numerous advantages. Among them is the ability to eliminate foot bars while still having a flange by which a foot can guide the positioning, and possibly aid in initially driving, the weed puller 65. Having a larger diameter anvil plate also allows the prongs to be spaced farther apart without increasing the diameter and thus the weight of body 85.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing an example of some such characterizations.

An embodiment of the present invention may be characterized as a weed puller comprising: a plurality of prongs positioned about an axis; an anvil plate coupled to the prongs; and a moveable mass adapted to be driven into the anvil plate so as to transmit a force through the anvil plate to the prongs where the force has a substantial component in line with the axis about which the plurality of prongs are positioned. In some instances it may also be characterized as further comprising a body having a cavity that terminates at the anvil plate with the moveable mass slideably positioned within the cavity. In some instances it may be said that the moveable mass is coupled to a rod that extends out of the cavity from an end opposite the anvil plate. In some instances it may be said that the weed puller also comprises three prongs coupled to the anvil plate at points that lie on or adjacent to the vertices of an equilateral triangle. In some instances it may be said that the prongs are elongated and have center lines that are substantially parallel to each other. In some instances it may be said that the body comprises a center line and the prong center lines are substantially parallel to body center line. In such or other instances it may be said that the mass is slideable along the center line of the body.

Another embodiment of the present invention may be characterized as a weed puller formed by welding two circular plates, one of the plates being the anvil plate, to the ends of a pipe after positioning a cylindrical mass coupled to a rod within the pipe such that the rod extends through a hole in the plate that is not the anvil plate. In some instances it may be said that the anvil plate has a diameter at least W inches greater than the diameter of the body where W is 1, 2, 3, or 6.

Yet another embodiment of the present invention may be characterized as a method of pulling a weed comprising: providing a weed puller as described herein; positioning the plurality of prongs around a weed to be pulled; driving the prongs into the ground around the weed by causing the mass to be driven into the anvil plate so as to transmit a force through the anvil plate to the prongs where the force has a substantial component in line with the axis about which the plurality of prongs are positioned. In some instances the method may be said to further comprise removing the prongs from the ground without pulling a plug from the ground. In other instances it may be said to comprise pulling the weed from the ground by removing the prongs from the ground. In some such instances driving the prongs into the ground may comprise driving at least one prong through a point between two segments the weed with severing either segment from the weed.

What is claimed is:

1. A weed puller comprising:
   a plurality of prongs positioned about an axis;
   an anvil plate coupled to the prongs;
   a moveable mass detached from the plurality of prongs;
   a body having a cavity that terminates at the anvil plate; and
   a rod attached to the moveable mass and extending outside the cavity, the rod controlling the movement of the moveable mass within the cavity;
   wherein the moveable mass is slideably positioned entirely within the cavity to directly strike the anvil plate.

2. The weed puller of claim 1 wherein the anvil plate is positioned between the moveable mass and the plurality of prongs.

3. The weed puller of claim 1 comprising three prongs extending from a surface of the anvil plate opposite the moveable mass at points that lie on or adjacent to the vertices of an equilateral triangle.

4. The weed puller of claim 3 wherein the three prongs are elongated and fixed in position relative to each other and have center lines that are substantially parallel to each other.

5. The weed puller of claim 4 wherein the body comprises a center line and the prong center lines are substantially parallel to body center line.

6. The weed puller of claim 5 wherein the moveable mass is slideable along the center line of the body.

7. The weed puller of claim 6 wherein the body is between 16 and 48 inches long, has walls between 1/64 and 1/2 inch thick, an internal diameter of between 1/2 and 4 inches, and an external diameter between 1/2 and 5 inches.

8. The weed puller of claim 1 further comprising handles positioned adjacent to an end opposite the anvil plate that project outward from the body by 0 to 18 inches.

9. The weed puller of claim 1 wherein the rod comprises a grip positioned opposite the moveable mass, and with the moveable mass against the anvil plate the grip projects outward from the body by 3 to 12 inches and includes finger contours.

10. The weed puller of claim 1 wherein the rod has a length of 7 to 48 inches and is formed from a cylindrical rod having a diameter of 1/16 to 4 inches.

11. The weed puller of claim 1 wherein the moveable mass is a cylindrical mass having a diameter slightly smaller than the internal diameter of the body, a length between 1 and 30 inches, and a weight of 1/4 to 10 pounds.

12. The weed puller of claim 3 wherein the three prongs are positioned at the corners of an equilateral triangle having sides between 1/2 and 10 inches long, and the prongs having a length between 1/2 and 14 inches.

13. The weed puller of claim 1 further comprising two circular plates, one of the plates being the anvil plate, welded to the ends of a pipe forming the body and retaining the moveable mass within the body where the moveable mass is a cylindrical mass coupled to a rod extending through a hole in a plate of the two circular plates that is not the anvil plate.

14. The weed puller of claim 13 wherein the anvil plate has a diameter at least 1 inch greater than the diameter of the body.

15. The weed puller of claim 1 further comprising foot bars attached to the body and positioned adjacent to the anvil plate.

16. A weed puller comprising:
   a plurality of prongs positioned about an axis;
   an anvil plate attached to the plurality of prongs;
   a body having a cavity that terminates at the anvil plate;
   a moveable mass detached from the plurality of prongs and adapted to be driven directly against the anvil plate so as to transmit a force through the anvil plate to the prongs where the force has with a substantial component in line with the axis about which the plurality of prongs are positioned and in a direction that the plurality of prongs point; and
   a rod attached to the moveable mass and extending outside the cavity, the rod controlling the movement of the moveable mass within the cavity.

17. The weed puller of claim 16 further comprising foot bars attached to the body and positioned adjacent to the anvil plate.

18. The weed puller of claim 16 wherein the rod comprises a grip positioned opposite the moveable mass.

* * * * *